United States Patent [19]

MacKinnon

[11] Patent Number: 6,039,101

[45] Date of Patent: Mar. 21, 2000

[54] CUTTING AND CREASING APPARATUS

[75] Inventor: Robin MacKinnon, London, United Kingdom

[73] Assignee: Korpak Limited, London, United Kingdom

[21] Appl. No.: 08/945,031

[22] PCT Filed: Apr. 22, 1996

[86] PCT No.: PCT/GB96/00938

§ 371 Date: Jan. 23, 1998

§ 102(e) Date: Jan. 23, 1998

[87] PCT Pub. No.: WO96/34725

PCT Pub. Date: Nov. 7, 1996

[30] Foreign Application Priority Data

May 1, 1995 [GB] United Kingdom .................... 9508801
Sep. 13, 1995 [GB] United Kingdom .................... 9518700

[51] Int. Cl.[7] ....................................... B26F 1/44
[52] U.S. Cl. .............................. 156/443; 83/128; 101/24; 156/250; 156/510; 493/59; 493/79; 493/356; 493/405
[58] Field of Search .................................... 156/250, 443, 156/510; 100/76, 92; 493/59, 79, 356, 405; 101/24; 83/128

[56] References Cited

U.S. PATENT DOCUMENTS

| | | | |
|---|---|---|---|
| 2,263,626 | 11/1941 | Halbig et al. ............................. | 525/56 |
| 3,584,572 | 6/1971 | Apicella ..................................... | 101/24 |
| 4,462,288 | 7/1984 | Boyce ....................................... | 83/128 |

FOREIGN PATENT DOCUMENTS

| | | |
|---|---|---|
| 0155665 | 9/1985 | European Pat. Off. . |
| 0116859 | 12/1987 | European Pat. Off. . |
| 0331605 | 9/1989 | European Pat. Off. . |
| 1158577 | 4/1960 | France . |
| 1436764 | 4/1966 | France . |
| 2490143 | 3/1982 | France . |
| 2599659 | 12/1987 | France . |
| 2646766 | 11/1990 | France . |
| 1311622 | 3/1973 | United Kingdom . |

Primary Examiner—Deborah Jones
Assistant Examiner—Robert R. Koehler
Attorney, Agent, or Firm—Howard & Howard

[57] ABSTRACT

An apparatus for the cutting and creasing of plastics material sheet is disclosed which comprises a cutting and creasing tool and a corresponding plate arranged for mutual contact characterized in that the plate is free of raised surfaces and is covered with a plastic material, preferably nylon. Additionally, an apparatus for preheating corrugated plastics sheet material is described which comprises a flat bed portion adapted to receive a stack of precut corrugated sheet material blanks with their direction of corrugation aligned, heating means at at least one end of the stack, and fan means at at least one end of the stack, the heating and fan means being arranged such as to direct heated air along the corrugation of at least some of the sheets in the stack and back via the remainder of the sheets in the stack in an endless loop.

11 Claims, 4 Drawing Sheets

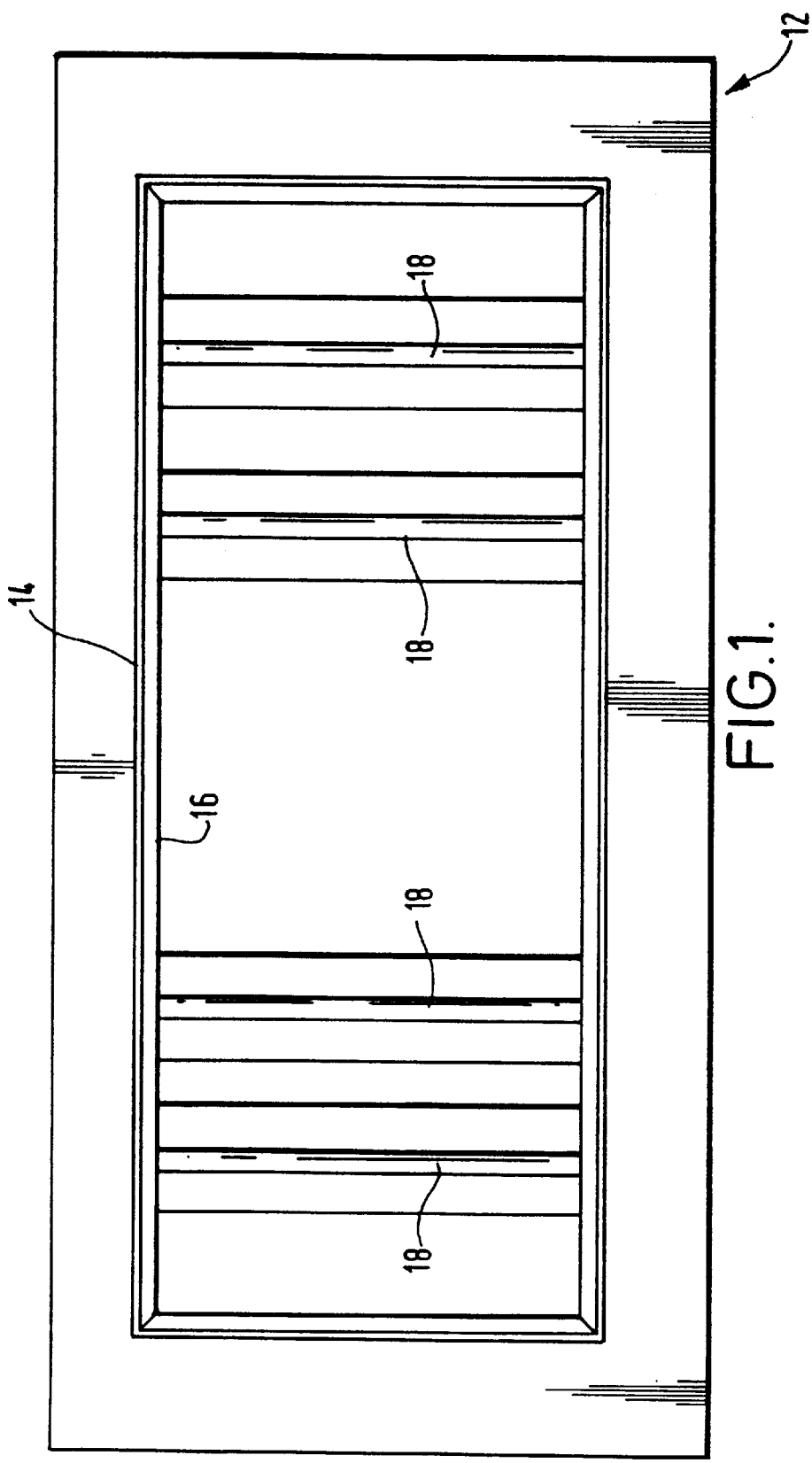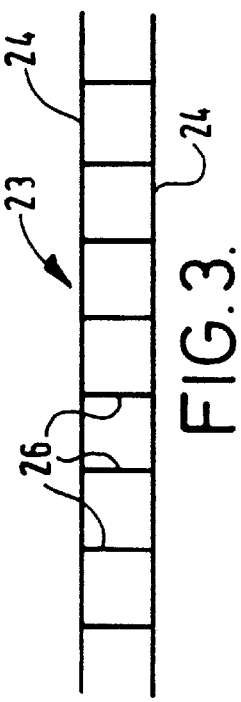

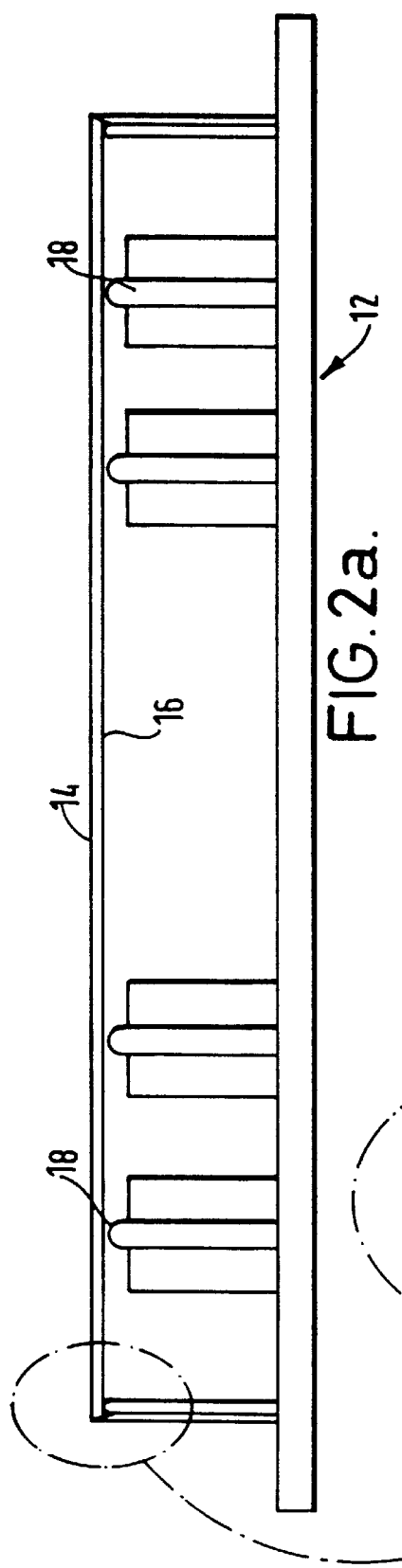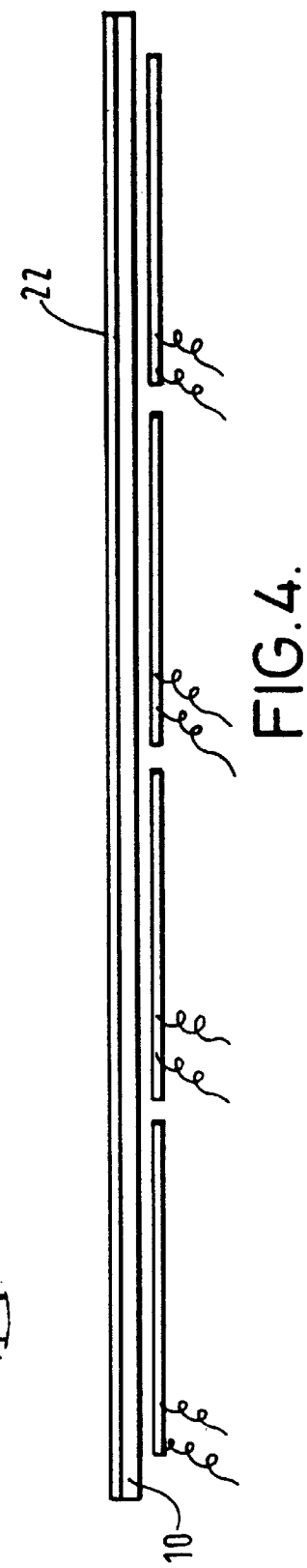

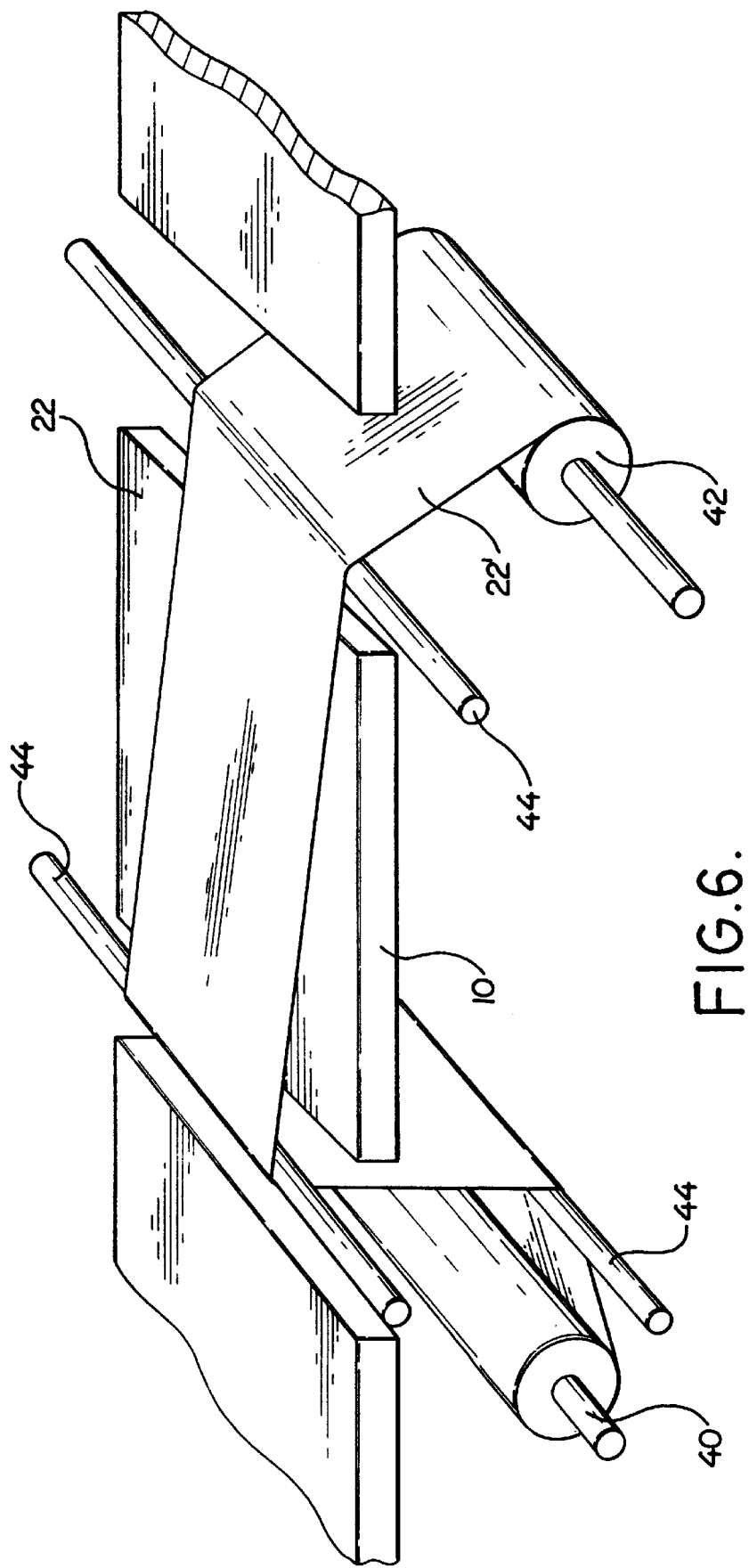

CUTTING AND CREASING APPARATUS

This invention relates to an apparatus for the cutting and creasing of plastics sheet materials, in particular such materials having voids therein sometimes referred to as corrugated sheets.

Cutting and creasing of such sheet materials is carried out mostly to produce blanks, e.g. for the production of cartons or boxes. Traditionally, box blanks of paper board and many plastics sheets have been cut and creased cold using pressure only. While this is satisfactory for some materials, plastic sheet material and blanks often retain a "memory" and tend to revert to their original configuration after creasing. This memory is particularly pronounced in polypropylene and other polyolefin-based materials and increases with the buckling resistance of the sheet. Furthermore, as the weight of corrugated sheet per unit area decreases in relation to thickness, thus giving rise to thinner sections, it becomes more difficult to convert into a useful blank free from cracking and able satisfactorily to resist shearing and other forces to which it is likely to be subject in use.

Another approach is to use a heated cutting and creasing tool which, provided sufficient heat is introduced into the sheet, overcomes both the general 'memory' problems of plastics sheet and the cracking, as well as the problems due to unsatisfactory resistance to shearing and other forces, but introduces problems of its own. In order that the strength and appearance of the sheet material is not impaired to too great an extent, it is necessary to protect the greater area of the sheet from the hot tooling during the cutting and creasing process so that the heat is applied principally in the areas to be cut and creased. This militates against the use of a flat metal bottom plate or platen. The use of a bottom plate or platen having raised "anvils" is successful but is relatively expensive and inflexible. That is, should the outline of the blank be changed in any degree it is necessary to produce a new bottom plate, often milled out of a solid block, and this is expensive. Moreover, it has been found that the repeated action, particularly of the cutting blades, can score the metal surface. In view of the heated environment, plastic material from the sheet can get trapped in these score lines thus rendering the tooling ineffective in that the products are not properly formed or are unsightly. Furthermore, the action of the cutting blades being arrested by a metal bottom tool blunts then and leads to the requirement for frequent refurbishment of them.

The invention seeks to provide a tooling apparatus improved in the above respects.

According to the present invention there is provided an apparatus for the cutting and creasing of plastics material sheet which comprises a cutting and creasing tool and a corresponding plate arranged for mutual contact characterised in that the plate is free of raised surfaces and is covered with a resilient material.

We have surprisingly found that excellent results can be obtained using a flat platen or bottom plate provided that its surface is, or is covered by, a layer of resilient material, especially a plastics material. The plastics material must be sufficiently tough and heat resistant to cope with the heat and the mechanical action of the cutting and creasing process and, while other materials may be used, we have found that a sheet of nylon 66 provides excellent results. In a preferred embodiment, two such sheets are employed, one thicker than the other, with the thinner sheet outermost. It has been found that when wear finally takes place on the outer sheet it can firstly be turned over and then be replaced without needing to replace the inner sheet for a further period of time.

It has been further found that the use of a continuously or intermittently indexed thin sheet of a cheap material, far less robust than nylon, for example brown paper, fed across the surface of the resilient material sheet to present a fresh portion, wholly or partly, each cycle further increase flexibility, reduces changeover time, reduces tool wear, and increases the life of the plastics material forming the surface of the platen while enhancing product quality.

The tool will normally be heated and the plate may or may not be heated. The plate may be a flat 'bottom' plate, in which case the tool and plate will be mounted for mutual reciprocation, or may be mounted around a drum which will be rolled in contact with the tool to effect creasing.

Alternatively, the cutting and creasing tool can be on a drum and rolled onto the flat plate. Alternatively, both the cutting and creasing tool and the plate may be mounted on drums.

It has also been found that, when the platen is heated, it is not necessary to hold the temperature of the platen or bottom plate at as high a level as had been employed. Commonly, and depending on cycle times together with sheet weight/thickness, temperatures of between approximately 70 and 150° C. had been employed. We have now found that temperatures as low as room temperature can nevertheless give satisfactory results. However, for reproducibility, it is preferred to maintain the platen or bottom plate above ambient temperature, e.g. at not less than approximately 40° C. The temperature of the cutting and creasing tool will be maintained at a similar temperature to formerly, namely in the region of 150° C. (+/−30° C.).

The apparatus of the invention is designed to work with corrugated plastics material sheet, and in particular with corrugated or "fluted" material sheet, in particular polyolefin material. This is a non-polar material and has in the past been difficult or impossible to cut, weld and crease with apparatus of the type described, with the difficulty increasing as the sheets' weight is decreased in relation to its thickness resulting in thinner sections. An additional problem with such corrugated sheet during the creasing process, is that the vertical corrugations or flutes tend to deform in different directions and at the bottom of the stroke of the cutting and creasing tool there may be anything from two to six or more thicknesses of the material at the creasing zone. It has been found that the use of a plastics material sheet on the platen gives sufficient flexibility to accommodate this variability and still give a satisfactory cut or crease. It will be appreciated that creasing is often produced by a welding action in which the top and bottom "skins" of the sheet material are welded together (with any intervening corrugations or flutes being sandwiched therebetween).

Particularly when operating the bottom platen at the lower temperatures which the apparatus of the present invention allows, it is preferred to preheat the corrugated sheet material before cutting and creasing. While the material can be preheated by exposing the sheet to a heat source, this is not preferred as it tends to heat the outer skins more than the interior when the opposite heat profile is preferred. The heat profile of just-extruded sheet material is ideal but for many reasons it is often not practical to have the cutting and creasing apparatus immediately down stream from an extruder.

According to another aspect of the present invention there is provided an apparatus for preheating corrugated plastics sheet material which comprises a flat bed portion adapted to receive a stack of precut corrugated sheet material blanks with their direction of corrugation aligned, heating means at at least one end of the stack, and fan means at at least one end of the stack, the heating and fan means being arranged such as to direct heated air along the corrugations of at least some of the sheets in the stack and back via the remainder of the sheets in the stack in an endless loop.

Preferably, a fan and heating means is provided at each end of the stack in communication with the open ends of the corrugations, and the stack may be divided approximately in half vertically so that hot air is directed from one fan and heating means through half the stack of sheets to the other side, and is then directed back via the other fan and heating means through the other half of the sheets back to the first fan and heating means. The hot air is then both 'pushed' into the flutes from one side and 'pulled' from them on the other giving a very effecient circulation. In this way the sheet blanks are heated from the inside out in contrast to being exposed to radiant heaters from the outside. Ideally, heated sheets are removed from the bottom of the stack and fresh unheated sheets added to the top of the stack, so that the sheets acheive optimum temperature as they pass down the stack in a continuous manner.

The invention will be described further, by way of example, with reference to the accompanying drawings, in which:

FIG. 1 is a bottom plan view of a cutting and creasing tool;

FIG. 2, illustrated in 2A and an enlarged view in 2B, is a sectional view corresponding to FIG. 1;

FIG. 3 is a diagrammatic sectional view of part of a corrugated plastics sheet material;

FIG. 4 is a side elevational view of a bottom plate;

FIG. 6 is diagrammatic perspective view of another embodiment.

Figure 5:
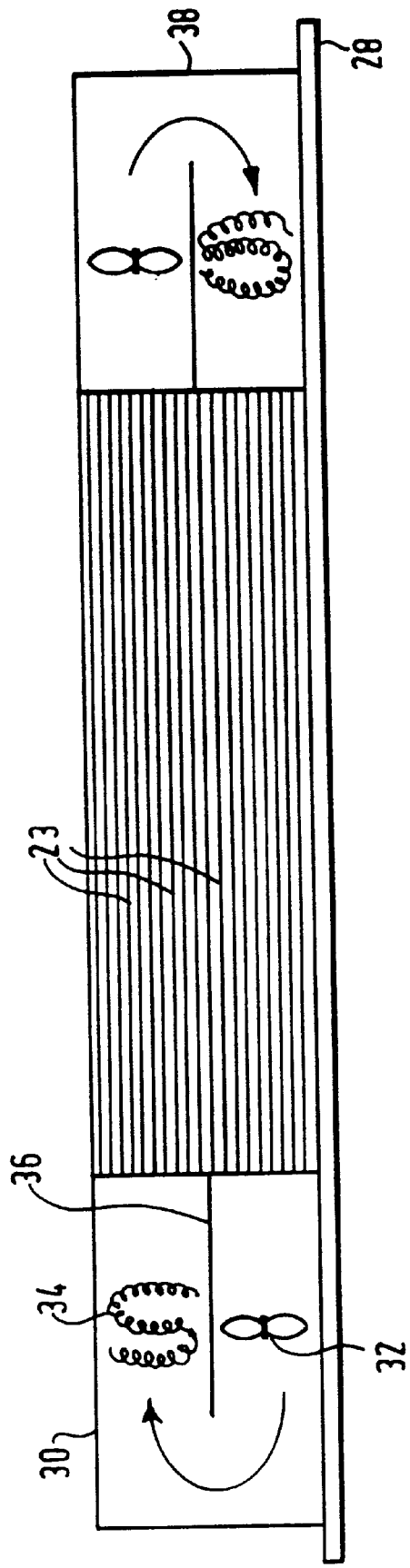
FIG. 5 is a sectional view of the heating apparatus.

Referring to the drawings, and in particular FIGS. 1 to 4, a cutting and creasing apparatus comprises a bottom plate or platen 10 which will normally be statically mounted. Located above the platen 10, and in register with it, is a cutting and creasing tool or top plate generally designated 12 mounted for reciprocation towards and away from the platen 10. The tool 12 as illustrated has a cutting rule 14, a welding rule 16 and creasing rules 18.

The platen 10 is provided with heaters 20 and, in accordance with the invention, with one or more covering layers of plastics sheet material 22. In a preferred embodiment a 1 mm thick sheet of nylon 66 is placed over the platen 10 and a second, 0.5 mm thick, sheet of nylon 66 is placed over the first sheet. The sheets may be secured at the edge of the platen 10 by any suitable means.

While such an apparatus can be used to cut and crease a variety of sheet material, it is particularly designed for use with corrugated plastics sheet material such as that illustrated in FIG. 3. It will be seen that such a sheet 23 has upper and lower skins 24 separated by generally vertical "flutes" 26 such material has a very high strength to weight ratio.

In use a length of sheet material is cut to size and placed on the bottom platen 10 over the plastic sheet layer 22. The top plate 12 is reciprocated towards the platen 10 and the cutting rule 14 cuts the sheet. The welding and creasing rules 16, 18 then come into contact with the sheet as the top plate continues in its cycle towards the platen 10. The limit of movement will normally be set by the contact desired by the cutting rule 14, the welding rule 16 and the creasing rules 18 with the sheet 22. The rules 16,18 are normally made of brass and are heated, e.g. to a temperature of around 150° C., at which they will melt or at least soften the polyolefin material of the sheet 23. The rules 16 and 18 deform the sheet 23 and crush any flutes 26 in the area of the rules. They weld the top and bottom skins 24 together with any intervening corrugations or flutes being sandwiched therebetween. This then produces a permanent creased area which will not return to it original configuration through plastic "memory".

The brass welding rule 16 welds the edge of the sheet 23 adjacent to the cut made by the cutting rule 14 and in so doing forms a "bead" in the channel between the cutting rule 14 and the welding rule 16. This gives a neat sealed and reinforced finish to the cut blank which needs to be comfortable to the touch.

Turning now to FIG. 5, a stack of sheets 23 is laid on a bed 28 with all the flutes 26 aligned in the same direction (left-right as shown in FIG. 5). At one end of the bed there is provided a chamber 30 of approximately the same width as the stack of sheets 23 and containing one or more axial fans 32 and one or more electrical heating elements 34. The chamber 30 is divided approximately half way up down the length of the stack by a divider 36. At the other side of the stack of sheets 23 is a corresponding chamber 38 in which the disposition of the fan and heaters are reversed with respect to the chamber 30.

Air is forced by the fan 32 through the heating element 34 down the internal corrugations defined by the flutes 26 of the topmost sheets 23 in the stack. The air then enters the chamber 38 where it is pushed through the further heating element and back through the corrugations in the bottommost sheets of the stack back to the chamber 30. In this manner hot air is continuously circulated through all the sheets in the stack until they have reached the desired temperature. They may then be fed to the cutting and creasing apparatus and a fresh stack of sheets heated up. The heating action, by concentrating the hot air down the interior corrugations of the sheets, produces the desired kind of heating effect from the inside out rather than the less satisfactory heating, from the outside in, produced by exposing individual sheets to external radiant or convected heating. In a preferred method of operation, fresh sheets are fed to the top of the stack and move continuously downward from the top of the stack to the bottom where they are removed. While the heating apparatus of FIG. 5 is ideally suited to preheat sheets of plastics materials for the cutting and creasing apparatus of the invention, it may be used to heat such sheets for other purposes.

Turning now to FIG. 6, and using like numerals for like parts, an embodiment is illustrated in which a continuous sheet 22' is indexed across the platen 10 at an angle thereto. The platen 10 is covered with a static sheet 22, e.g. of nylon, which corresponds to the 'thicker' sheet referred to above (and the thinner sheet of nylon may also be present). The sheet 22' is led from feed roller 40 to take-up roller 42 via guide bars 44 and is indexed forward a small amount in between cutting cycles thereby presenting a fresh portion each time to the cutting rules 14. In view of this, a far less robust material than nylon can be used for the sheet 22', and brown paper has been found to be satisfactory. The sheet 22' nevertheless protects the sheet 22 and ensures long life for it. The guide bars 44 ensure even tensioning of the continuous sheet 22'

The cutting and creasing apparatus of the invention has many advantages: tool wear is reduced since metal to metal contact is eliminated; the difficulty and thus cost of getting the necessary accuracy of fit between the mating surfaces of the cutting tool with an anvil type bottom plate is eliminated; the impairment to the strength of the sheet's load bearing sections through use of high temperatures is reduced; the appearance of the sheet is improved as less heat may be used; splitting of the sheet which could take place, particularly around sharp corners or when creasing in the direction of the flutes 26, may be eliminated; and design changes in the cutting and creasing tool do not require any changes in the platen.

I claim:

1. An apparatus for the welding, cutting and creasing of plastics material sheet which comprises a heated cutting and creasing tool and a corresponding plate arranged for mutual contact characterised in that the plate is free of raised surfaces and is covered with two layers of a resilient material, at least the outer layer being replaceable.

2. An apparatus as claimed in claim 1 wherein a welding rule is positioned alongside the cutting rule on the tool.

3. An apparatus as claimed in claim 1 or 2 in which the resilient material is a plastics material.

4. An apparatus as claimed in claim 3 in which the plastics material is a sheet of nylon.

5. An apparatus as claimed in any of claim 1 to 4 in which two sheets of plastics material are employed, one thicker than the other, with the thinner sheet outermost.

6. An apparatus as claimed in any of claim 1 to 5 in which the plate is heated.

7. An apparatus as claimed in claim 6 in which the plate is heated to lower level than had formerly been used with previous types of apparatus.

8. An apparatus as claimed in claim 7 in which temperatures of approximately 40° C. are employed.

9. An apparatus as claimed in any of claim 1 to 8 in which a continuous sheet is capable of being indexed across the plate from a feed assembly to a takeup assembly by a small amount between cutting/creasing welding cycles whereby to present a fresh portion of sheet, either wholly or partly, each cycle.

10. An apparatus as claimed in claim 9 in which there is a fixed resilient sheet below the indexed sheet and the latter is thinner than the fixed sheet.

11. An apparatus as claimed in claim 8 in which the indexed sheet is of paper.

* * * * *